(12) United States Patent
Lien et al.

(10) Patent No.: US 9,052,776 B2
(45) Date of Patent: Jun. 9, 2015

(54) OPTICAL TOUCH MODULE AND OPTICAL TOUCH COMPONENT STRUCTURE

(71) Applicant: ASIA VITAL COMPONENTS CO., LTD., New Taipei (TW)

(72) Inventors: Cheng-Nan Lien, New Taipei (TW); Jinhua Tan, New Taipei (TW); Zijun Meng, New Taipei (TW); Chih-Wei Chang, New Taipei (TW)

(73) Assignee: ASIA VITAL COMPONENTS CO., LTD., New Taipei (TW)

( * ) Notice: Subject to any disclaimer, the term of this patent is extended or adjusted under 35 U.S.C. 154(b) by 56 days.

(21) Appl. No.: 14/056,957

(22) Filed: Oct. 18, 2013

(65) Prior Publication Data

US 2015/0109256 A1    Apr. 23, 2015

(51) Int. Cl.
  *G06F 3/041*   (2006.01)
  *G06F 3/042*   (2006.01)
  *G06F 1/16*    (2006.01)

(52) U.S. Cl.
  CPC .............. *G06F 3/042* (2013.01); *G06F 1/1643* (2013.01); *G06F 3/0421* (2013.01)

(58) Field of Classification Search
  None
  See application file for complete search history.

(56) References Cited

U.S. PATENT DOCUMENTS

| 2009/0002340 | A1* | 1/2009 | Van Genechten | 345/175 |
| 2011/0267314 | A1* | 11/2011 | Huang | 345/175 |
| 2014/0218633 | A1* | 8/2014 | Lin et al. | 349/12 |
| 2014/0264036 | A1* | 9/2014 | Hung et al. | 250/349 |

* cited by examiner

*Primary Examiner* — Joseph Haley

(57) ABSTRACT

An optical touch component structure includes multiple optical touch modules and multiple L-shaped connection boards, which are assembled to form a frame body. Each optical touch module includes an LED circuit board and a control circuit board. The L-shaped connection boards are respectively connected to two ends of the control circuit boards. At least one first and second connector are disposed on correspondingly overlapping sections of the LED circuit board and the control circuit board and vertically mated with each other. Two outermost ends of the control circuit boards have two third connectors horizontally mated with fourth connectors of the L-shaped connection boards. A space exists between the LED circuit board and the control circuit board and between the LED circuit board and the L-shaped connection board. Electronic components are disposed in the space and an extension section of a filter member extends into the space.

28 Claims, 13 Drawing Sheets

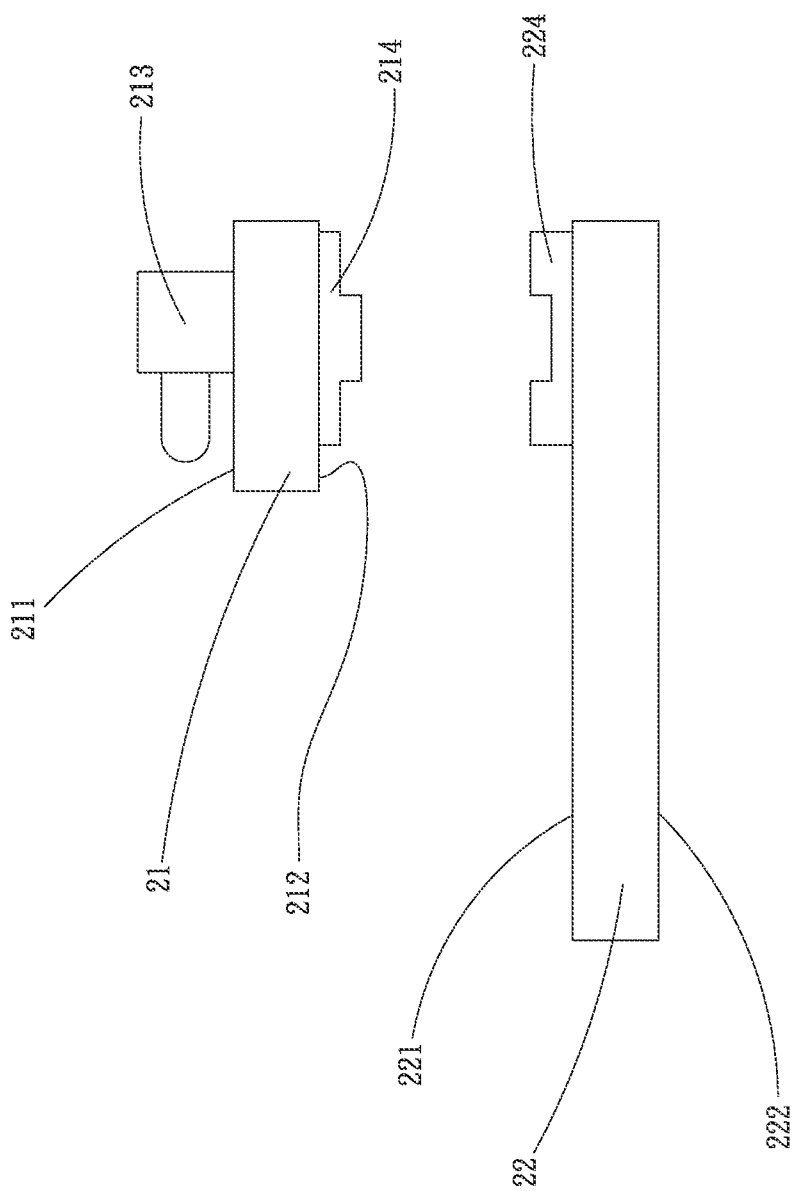

OPTICAL TOUCH MODULE AND OPTICAL TOUCH COMPONENT STRUCTURE

BACKGROUND OF THE INVENTION

1. Field of the Invention

The present invention relates generally to a touch module and a touch component structure, and more particularly to an optical touch module and an optical touch component structure.

2. Description of the Related Art

Due to the promotion of the quality of LED and the advance of the manufacturing process, optical touch module has the advantages of high transparency, sensitivity to touch of any material and applicability to large-size device. Accordingly, optical touch module is currently widely applied to various displays. The principle of the optical touch display is to employ LED transmitters and LED receivers arranged on opposite sides of the surface of the display. The infrared LEDs around the surface of the display screen form a dense infrared network in X axis and Y axis on the surface. When a non-transparent object interrupts the infrared ray, the X-axis and Y-axis coordinates are naturally found. The infrared LEDs are independent from each other. The location can be achieved simply by means of analyzing the interruption position. Finally, a control circuit calculates and transmits the signal to a PC to show the touch position on the screen. Alternatively, other programs will execute other signal operation and application. The infrared touch panel is triggered by means of interrupting the LED infrared signal so that the signal can be triggered without touching the substrate. Therefore, the infrared touch panel has the advantage of high sensitivity.

FIG. 1A is a top view of a conventional infrared touch device 10. The infrared touch device 10 includes a frame body composed of four infrared touch modules 11. Two sets of corresponding LED transmitters 12 and LED receivers 13 are respectively disposed on two opposite sides of the frame body. The LED transmitters 12 are respectively aimed at the LED receivers 13.

FIG. 1B is a sectional view taken along line X-X of FIG. 1A, which shows the cross section of one side of the infrared touch device 10 for illustrating the composition of one infrared touch module 11 (as shown in FIG. 1A). The LED transmitter is taken as an example in the drawing. However, the LED receiver has the same composition. The infrared touch circuit module includes a control circuit board 111 on which an LED circuit board 112 is disposed. The LED transmitter 12 is disposed on the LED circuit board 112. Control IC is disposed on the control circuit board 111 for controlling the LED transmitter 12 of the LED circuit board 112. The control circuit board 111 and the LED circuit board 112 are connected with each other by means of soldering. Accordingly, multiple first soldering points 15 of solder material are formed between the opposite faces of the control circuit board 111 and the LED circuit board 112 in predetermined positions. The control circuit board 111 and the LED circuit board 112 are connected through the first soldering points 15, whereby the signals of the two circuit boards are transmitted through the first soldering points 15. In general, in consideration of the signal transmission between the two circuit boards, there is more than one first soldering point 15. Generally, the solder material is formed of those metal materials with lower melting point, such as tin.

Please refer to FIG. 1C, which is a perspective view of the conventional infrared touch device composed of four infrared touch modules 11 connected with each other to form the frame body. Four L-shaped connection boards 16 are used as four corners of the frame body. Each L-shaped connection board 16 is connected between two infrared touch modules 11 of two sides of the frame body. That is, each infrared touch module 11 is connected between two L-shaped connection boards 16. The four infrared touch modules 11 are connected with each other via the four L-shaped connection boards 16 to form the frame body.

Please now refer to FIG. 1D, which is a sectional view taken along line Y-Y of FIG. 1C. The four L-shaped connection boards 16 are disposed under the control circuit board 111 and connected therewith by means of soldering. Multiple second soldering points 17 of solder material are formed between the control circuit board 111 and the L-shaped connection boards 16 in predetermined positions. By means of the second soldering points 17, the four infrared touch modules 11 are connected with each other for signal transmission therebetween.

According to the above, each L-shaped connection board 16 is connected between the control circuit boards 111 of two infrared touch modules 11 of two sides of the frame body. In general, there are more than one first soldering point 15 and more than one second soldering point 17. Therefore, it takes long time to complete the soldering operation and it is hard to control the quality. Moreover, it is impossible to arrange any component on the opposite faces of the control circuit board 111 and the LED circuit board 112, that is, the overlapping sections of the two circuit boards. As a result, the infrared touch device 10 has a large invalid area. This is unbeneficial to circuit design and it is hard to rework or service the device.

SUMMARY OF THE INVENTION

It is therefore a primary object of the present invention to provide an optical touch module and an optical touch component structure. In the optical touch module, the LED circuit board and the control circuit board are connected with each other by means of connectors for signal transmission between the two circuit boards. The connectors can be repeatedly plugged and unplugged so that it is convenient to locate and assemble the optical touch modules without any soldering process. In this case, the malfunction due to improper soldering operation can be avoided. Moreover, the optical touch module is easy to rework and service and reassemble into the original state.

It is a further object of the present invention to provide the above optical touch module and the optical touch component structure. In the optical touch module, the LED circuit board and the control circuit board are connected with each other by means of connectors, whereby a height gap exists between the opposite faces of the LED circuit board and the control circuit board. This increases usable space so that electronic components with a height smaller than that of the connectors can be arranged on the opposite faces of the LED circuit board and the control circuit board. Also, an extension section of a filter member can extend into the space to increase the connection strength as a whole.

To achieve the above and other objects, the optical touch module of the present invention includes: an LED circuit board having a first top face and a first bottom face, multiple LED components being disposed on the first top face, the first bottom face having at least one first connector; and a control circuit board positioned under the LED circuit board, the control circuit board having a second top face and a second bottom face, the second top face facing the first bottom face of the LED circuit board and having at least one second connector corresponding to the first connector and two third connectors respectively positioned at two outermost ends of the control circuit board and misaligned from the first connector, the first and second connectors being vertically mated with each other so as to connect the control circuit board under the LED circuit board, the second bottom face having at least one third connector, the first and second connectors being vertically mated with each other so as to connect the control circuit board under the LED circuit board, a height gap existing between the LED circuit board and the control circuit board, whereby a space is positioned between correspondingly overlapping sections of the first bottom face of the LED circuit board and the second top face of the control circuit board, the first and second connectors being positioned in the space.

The optical touch component structure of the present invention includes: multiple optical touch modules and multiple L-shaped connection boards, which are assembled to form a frame body, each L-shaped connection board being connected between two optical touch modules of two sides of the frame body, each optical touch module including: an LED circuit board having a first top face and a first bottom face, multiple LED components being disposed on the first top face, the first bottom face having multiple first connectors; and a control circuit board positioned under the LED circuit board, the control circuit board having a second top face and a second bottom face, the second top face facing the first bottom face of the LED circuit board and having at least one second connector and two third connectors, the second connector corresponding to the first connectors, the two third connectors being respectively positioned at two outermost ends of the control circuit board, the L-shaped connection boards being positioned under the LED circuit board and respectively connected to two ends of the control circuit boards, each L-shaped connection board having a third top face facing the first bottom face of the LED circuit board, the third top face of the L-shaped connection board having at least one fourth connector corresponding to the third connector, the first and second connectors being vertically mated with each other and the third and fourth connectors being horizontally mated with each other, a height gap existing between the LED circuit board and the control circuit board and between the LED circuit board and the L-shaped connection board, whereby a space is positioned between correspondingly overlapping sections of the first bottom face of the LED circuit board and the second top face of the control circuit board and between correspondingly overlapping sections of the first bottom face of the LED circuit board and the third top face of the L-shaped connection board, the first and second connectors and third and fourth connectors being positioned in the space.

Alternatively, the optical touch component structure of the present invention includes: multiple optical touch modules assembled into a frame body, each optical touch module including: an LED circuit board having a first top face and a first bottom face, multiple LED components being disposed on the first top face, the first bottom face having multiple first connectors; and a control circuit board positioned under the LED circuit board, the control circuit board having a second top face and a second bottom face, the second top face facing the first bottom face of the LED circuit board and having at least one second connector and two third connectors, the second connector being correspondingly in adaptation to the first connectors, the second bottom face having at least one third connector; multiple L-shaped connection boards positioned under the LED circuit boards, each L-shaped connection board having a third top face facing the first bottom face of the LED circuit board, the third top face of the L-shaped connection board having at least one fourth connector corresponding to the third connector, the first and second connectors being vertically mated with each other, two L-shaped connection boards being respectively connected to two ends of each control circuit board, the fourth connectors of the L-shaped connection board being horizontally connected with the third connectors, a height gap existing between the LED circuit board and the control circuit board and between the LED circuit board and the L-shaped connection board, whereby a space is positioned between correspondingly overlapping sections of the first bottom face of the LED circuit board and the second top face of the control circuit board and between the first bottom face of the LED circuit board and the third top face of the L-shaped connection board, the first and second connectors and the third and fourth connectors being positioned in the space; and multiple filter members respectively connected with the optical touch modules, each filter member including: a main body; an upper protrusion section extending from an upper end of the main body to one side thereof; and an extension section extending from a lower end of the main body to one side thereof, the upper protrusion section extending to upper sides of the LED components, the main body being positioned in front of the LED components to shield the LED components, the extension section extending into the space between the first bottom face of the LED circuit board and the second top face of the control circuit board and between the first bottom face of the LED circuit board and the third top face of the L-shaped connection board.

According to the above arrangement, it is convenient to locate and assemble the optical touch modules without any soldering process. In this case, the malfunction due to improper soldering operation can be avoided. Moreover, the optical touch module is easy to rework and service and reassemble into the original state. Also, a space exists between the opposite faces of the LED circuit board and the control circuit board. In this case, the arrangement space for electronic components is increased. Also, an extension section of a filter member can extend into the space to increase the connection strength as a whole.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein:

FIG. 2 is an exploded view of the optical touch module of the present invention;

DETAILED DESCRIPTION OF THE PREFERRED EMBODIMENTS

Figure 1A:
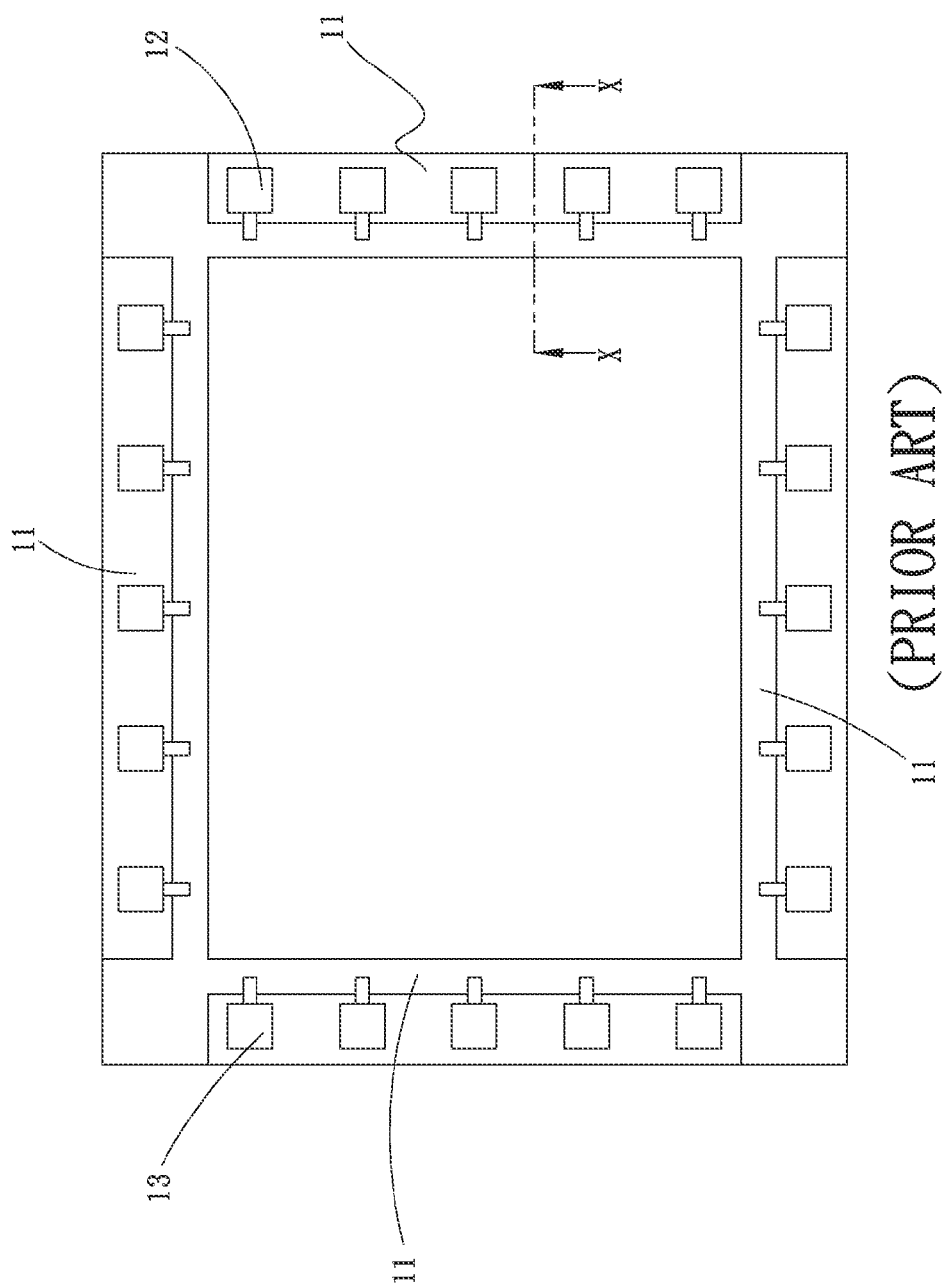
FIG. 1A is a top view of a conventional infrared touch component structure.
Figure 1B:
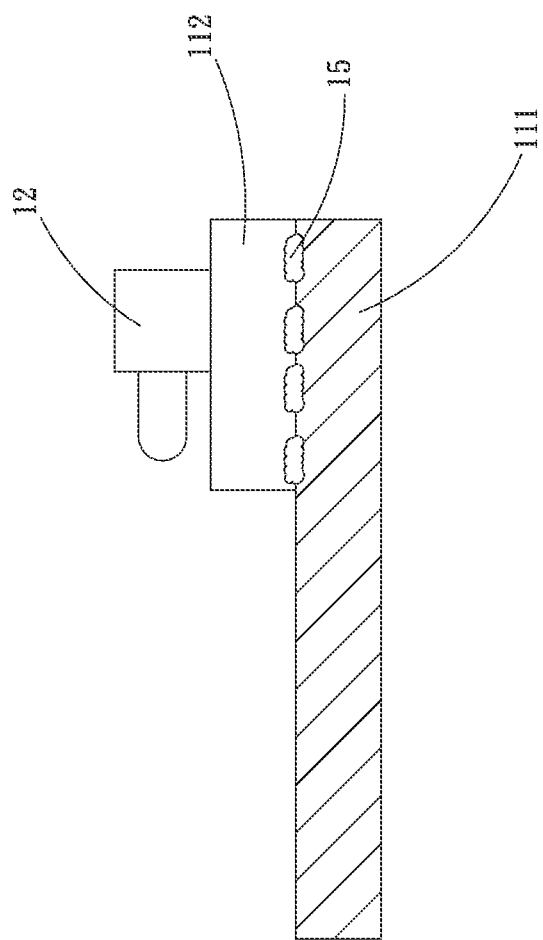
FIG. 1B is a sectional view taken along line X-X of FIG. 1A.
Figure 1C:
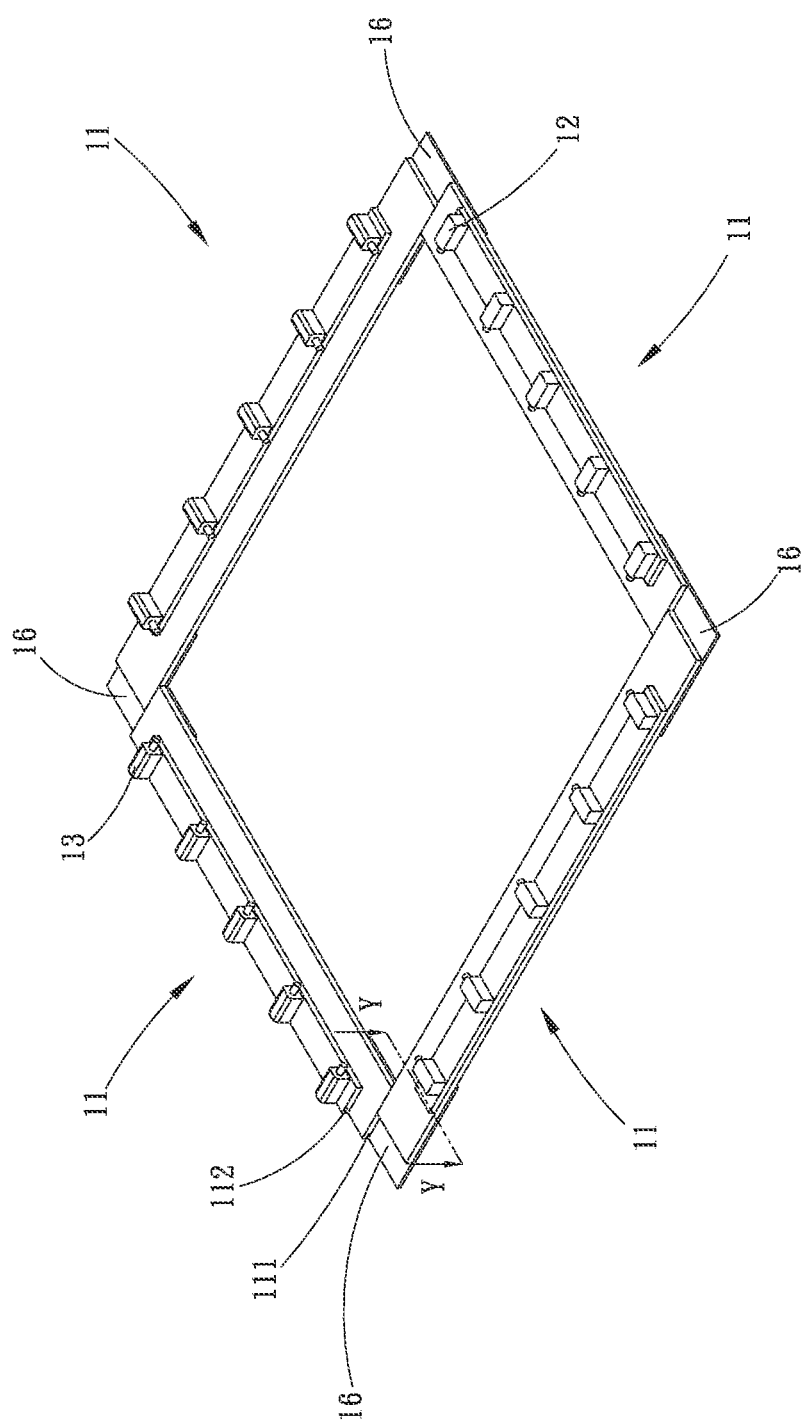
FIG. 1C is a perspective view of the conventional infrared touch component structure composed of four infrared touch modules connected with each other to form a frame body.
Figure 1D:
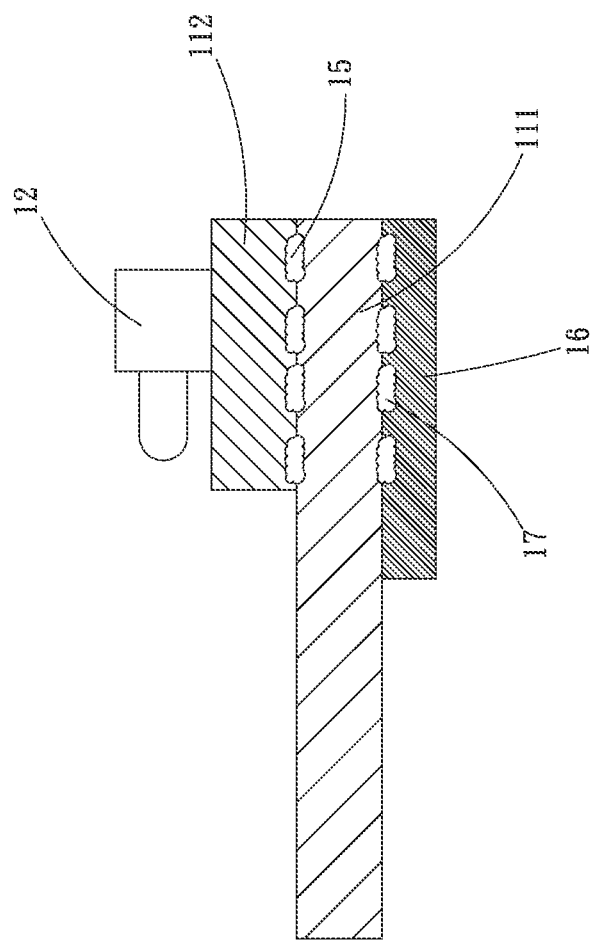
FIG. 1D is a sectional view taken along line Y-Y of FIG. 1C.

The embodiments of the present invention will be described hereinafter with reference to the drawings, wherein the same components are denoted with the same reference numerals.

Figure 3A:
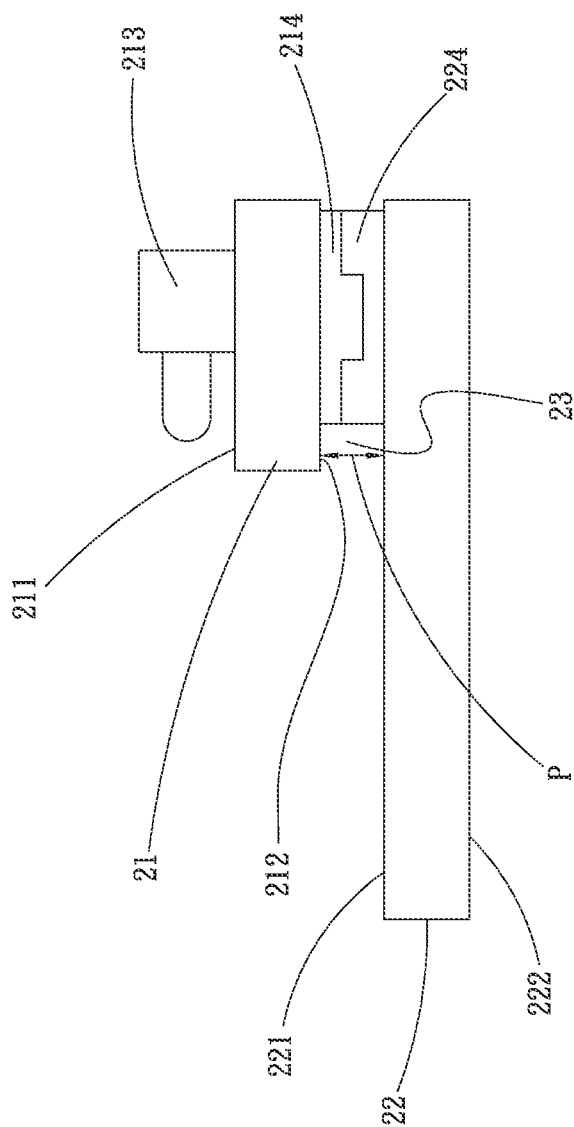
FIG. 3A is an assembled view of the optical touch module of the present invention.
Figure 3B:
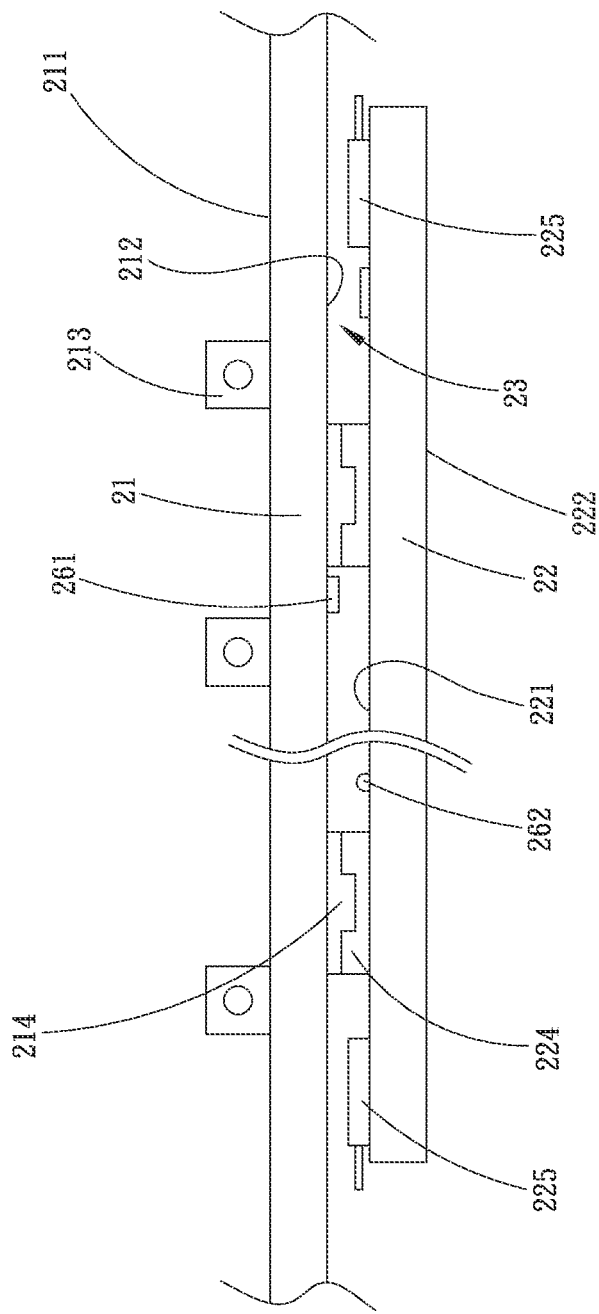
FIG. 3B is a view of a part of the optical touch module of the present invention.

Please refer to FIGS. 2, 3A and 3B. FIG. 2 is an exploded view of the optical touch module of the present invention. FIG. 3A is an assembled view of the optical touch module of the present invention. FIG. 3B is a view of a part of the optical touch module of the present invention. The optical touch module 20 of the present invention includes an LED circuit board 21 and a control circuit board 22. The LED circuit board 21 has a first top face 211 and a first bottom face 212. Multiple LED components 213 are disposed on the first top face 211. The first bottom face 212 has at least one first connector 214. The control circuit board 22 is positioned under the LED circuit board 21. The control circuit board 22 has a second top face 221 and a second bottom face 222. The second top face 221 faces the first bottom face 212 of the LED circuit board 21 and has at least one second connector 224 and two third connectors 225. The second connector 224 is correspondingly plug-connected with the first connector 214. The two third connectors 225 are respectively positioned at two outermost ends of the control circuit board 22 and misaligned from the first connector 214. The second connector 224 is vertically directed, while the third connector 225 is horizontally directed.

The first connector 214 is a male connector, while the second connector 224 is a female connector in adaptation to the first connector 241. Alternatively, the first connector 214 is female connector, while the second connector 224 is a male connector in adaptation to the first connector 241. The first and second connectors 214, 224 can be correspondingly plug-connected with each other or disconnected from each other so that the connectors can be flexibly replaced. The connector means a medium for connecting two or more objects, such as a socket, a terminal or wiring harness. The connector generally means the connection component and the accessory thereof applied to electronic signal transmission and power supply as a bridge between the interrupted or isolated circuits for passing of current and making the circuits function.

The first and second connectors 214, 224 are vertically mated with each other so as to connect the control circuit board 22 under the LED circuit board 21. A height gap p exists between the LED circuit board 21 and the control circuit board 22, whereby a space 23 is positioned between the correspondingly overlapping sections of the first bottom face 212 of the LED circuit board 21 and the second top face 221 of the control circuit board 22. The first and second connectors 214, 224 are positioned in the space 23. The height gap p is defined by the total thickness of the first and second connectors 214, 224 mated with each other.

Please now refer to FIG. 3B. The space 23 exists between the overlapping sections of the first bottom face 212 of the LED circuit board 21 and the second top face 221 of the control circuit board 22. Under such circumstance, at least one electronic component can be arranged in the space 23. The electronic component has a height smaller than the height of the first connector 214 or the second connector 224. In the drawing, an electronic component 261 is disposed under the first bottom face 212 of the LED circuit board 21 in a position avoiding the first connector 214. In addition, an electronic component 262 is disposed on the second top face 221 of the control circuit board 22 in a position avoiding the second connector 224. The two electronic components 261, 262 are positioned in the space 23.

Figure 4:
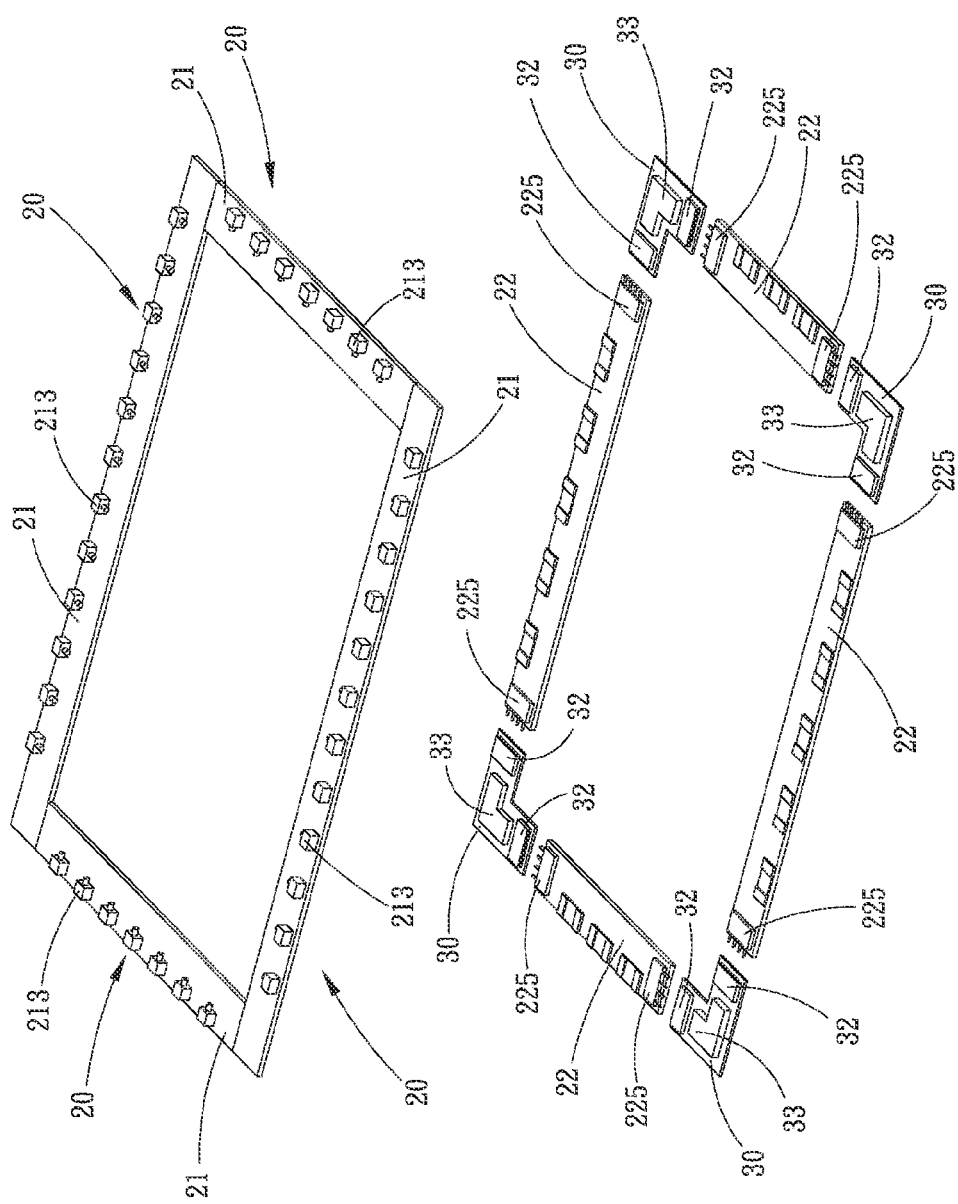
FIG. 4 is a perspective exploded view of the optical touch component structure of the present invention.

Please now refer to FIG. 4, which is a perspective exploded view of the optical touch component structure of the present invention. Four optical touch modules 20 are connected with each other by means of four L-shaped connection boards 30 to form the optical touch component structure in the form of a frame body. The four L-shaped connection boards 30 serve as four corners of the frame body. Each L-shaped connection board 30 is connected between two optical touch modules 20 of two sides of the frame body. That is, two ends of each optical touch module 20 are respectively connected with two L-shaped connection boards 30. The two sets of LED components 213 of the optical touch modules 20 on two opposite sides of the frame body correspond to each other. The LED components 213 on one side are infrared transmitters, while the LED components 213 on the opposite side are infrared receivers.

Figure 5A:
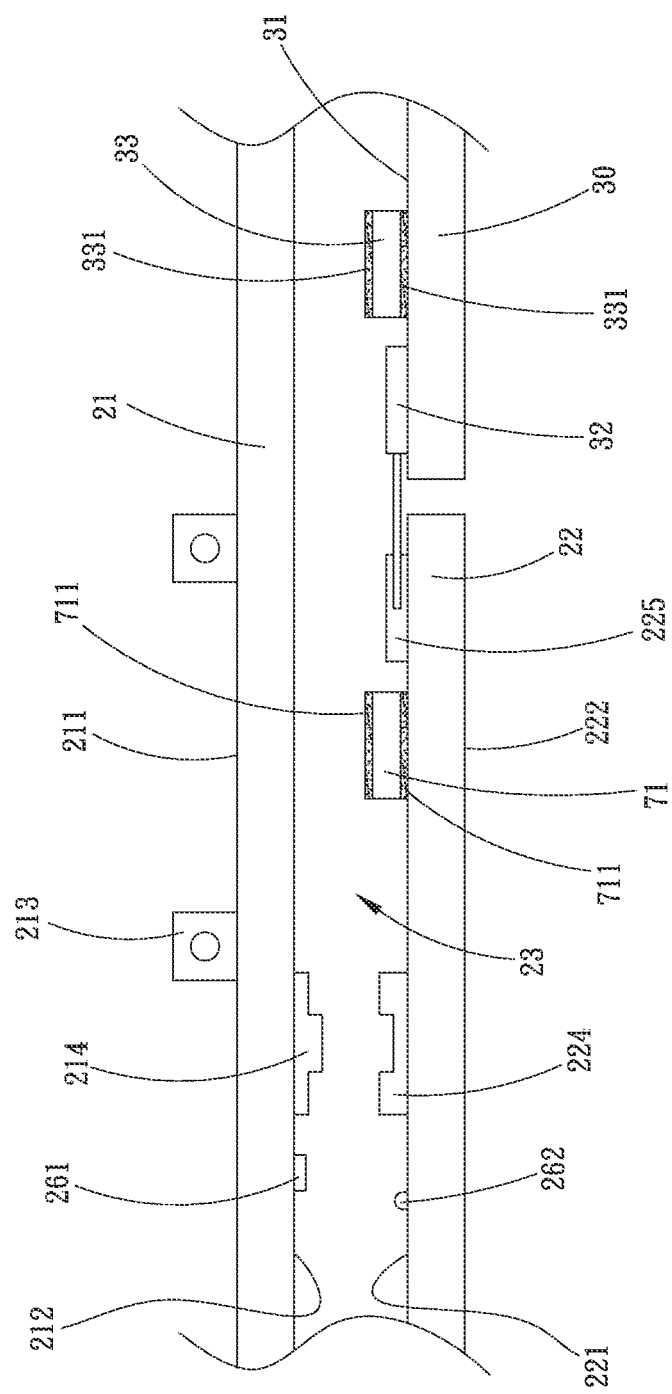
FIG. 5A is an exploded view of the optical touch component structure of the present invention.
Figure 5B:
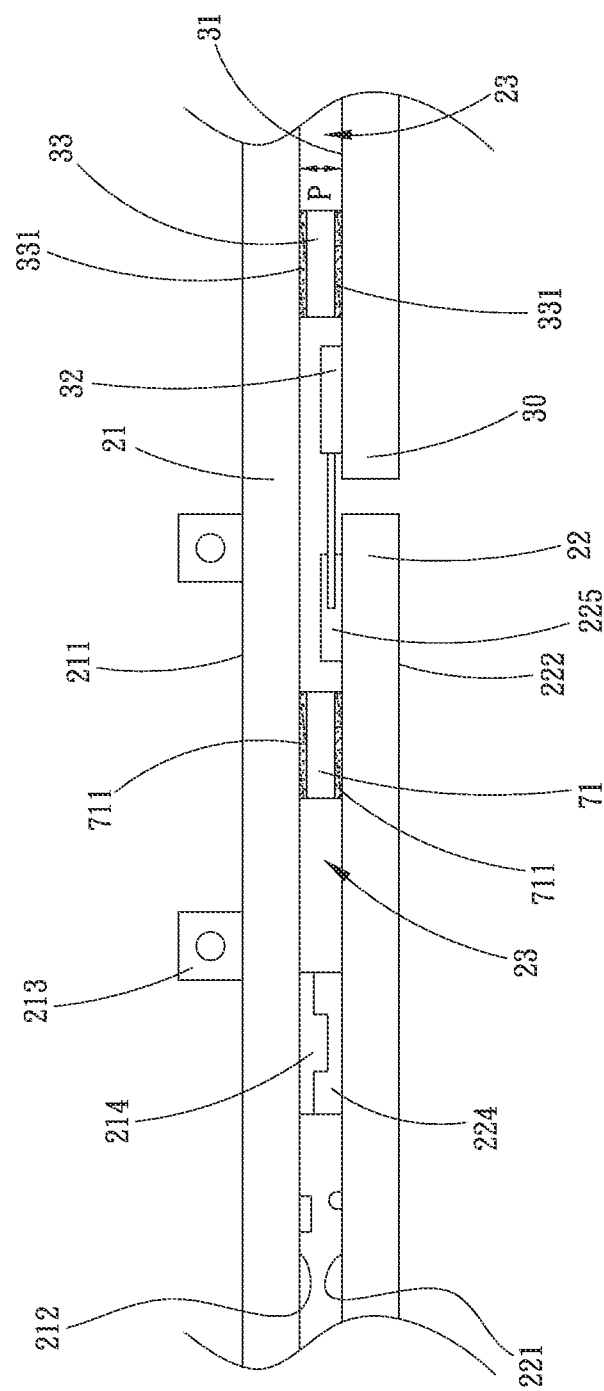
FIG. 5B is an assembled view of the optical touch component structure of the present invention.

Please now refer to FIGS. 5A and 5B. FIG. 5A is an exploded view of the optical touch component structure of the present invention. FIG. 5B is an assembled view of the optical touch component structure of the present invention. Also referring to FIG. 4, the L-shaped connection boards 30 are respectively disposed on outer sides of two ends of the control circuit board 22 of each optical touch module 20. In the drawings, only the L-shaped connection board 30 at one end is shown. The L-shaped connection board 30 has a third top face 31 on which two fourth connectors 32 are disposed corresponding to the third connectors 225 of the control circuit boards 22 of two adjacent optical touch modules 20. The third connectors 225 are male connectors or female connectors, while the fourth connectors 32 are female connectors or male connectors.

When assembled, the third connectors 225 of the control circuit boards 22 are first horizontally left and right mated with the fourth connectors 32 of the L-shaped connection boards 30, whereby the control circuit boards 22 are assembled with the L-shaped connection boards 22. Then, the first bottom face 212 of the LED circuit board 21 of the optical touch module 20 faces the second top face 221 of the lower control circuit board 22 and the third top face 31 of the L-shaped connection board 30. The first connector 214 is vertically mated with the second connector 224, whereby the control circuit board 22 and the L-shaped connection board 30 are mounted under the LED circuit board 21.

The height gap p not only exists between the LED circuit board 21 and the control circuit board 22, but also exists between the LED circuit board 21 and the L-shaped connection board 30. The space 23 is positioned between the correspondingly overlapping sections of the first bottom face 212 of the LED circuit board 21 and the second top face 221 of the control circuit board 22 and between the correspondingly overlapping sections of the first bottom face 212 of the LED circuit board 21 and the third top face 31 of the L-shaped connection board 30. The first and second connectors 214, 224 and the third and fourth connectors 225, 32 are positioned in the space 23.

The electronic component 261 disposed under the first bottom face 212 of the LED circuit board 21 and the electronic component 262 disposed on the second top face 221 of the control circuit board 22 are positioned in the space 23.

In addition, at least one cushion pad 71 is disposed between the LED circuit board 21 and the control circuit board 22 in a position avoiding the first and second connectors 214, 224. Upper and lower ends of the cushion pad 71 respectively abut against the first bottom face 212 of the LED circuit board 21 and the second top face 221 of the control circuit board 22. The upper and lower ends of the cushion pad 71 can be adhered to the first bottom face 212 and the second top face 221 by means of adhesive members 711. The cushion pad 71 provides a support force for the suspending section of the LED circuit board 21 relative to the control circuit board 22, (that is, the section free from the first and second connectors 214, 224) to support the LED circuit board 21.

Similarly, a cushion pad 33 is disposed between the LED circuit board 21 and the L-shaped connection board 30 in a position avoiding the fourth connector 32. Upper and lower ends of the cushion pad 33 respectively abut against the first bottom face 212 of the LED circuit board 21 and the third top face 31 of the L-shaped connection board 30. The upper and lower ends of the cushion pad 33 can be adhered to the first bottom face 212 and the third top face 31 by means of adhesive members 331. The cushion pad 33 provides a support force for the suspending section of the LED circuit board 21 relative to the L-shaped connection board 30 to support the LED circuit board 21. The adhesive members 331, 711 are such as double-faced adhesive tapes or the like.

Figure 6A:
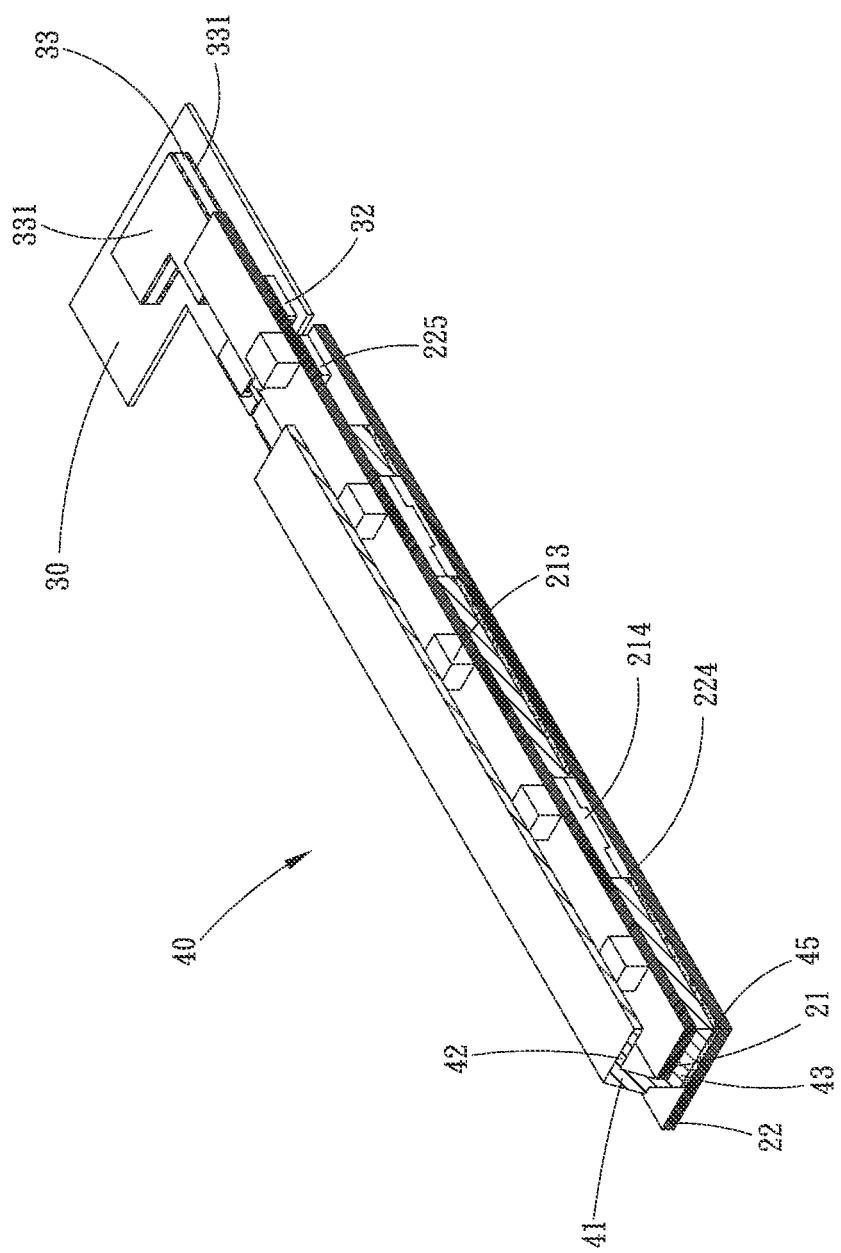
FIG. 6A is a sectional view of the optical touch component structure of the present invention, which has a filter member.
Figure 6B:
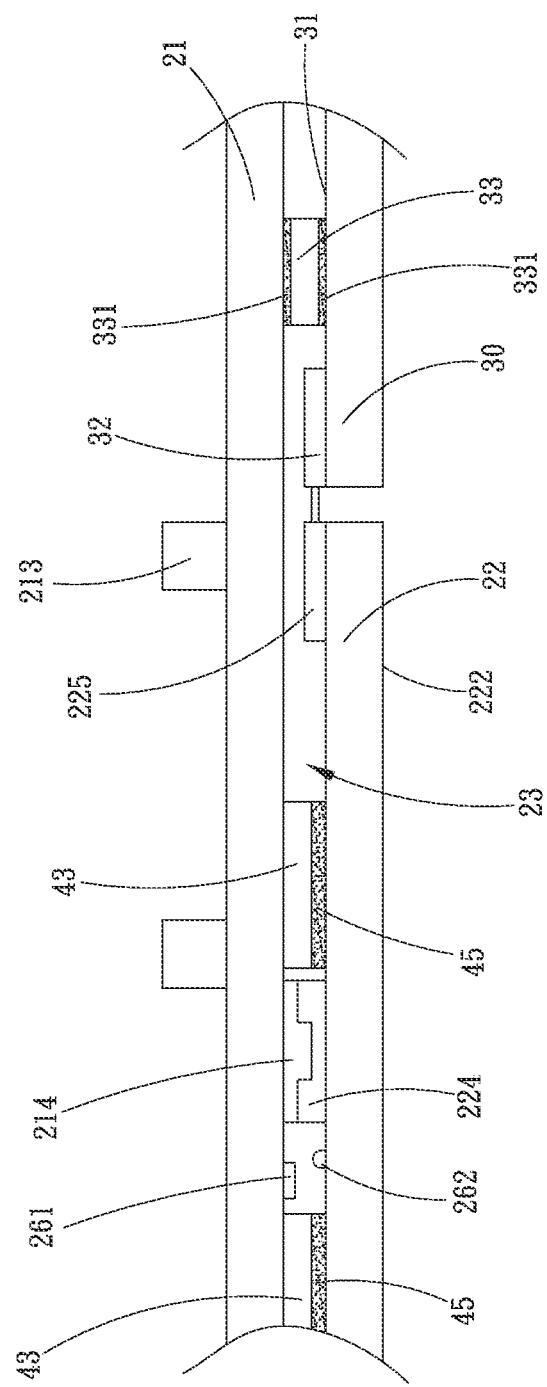
FIG. 6B is a front view of the optical touch component structure of the present invention, which has a filter member.
Figure 6C:
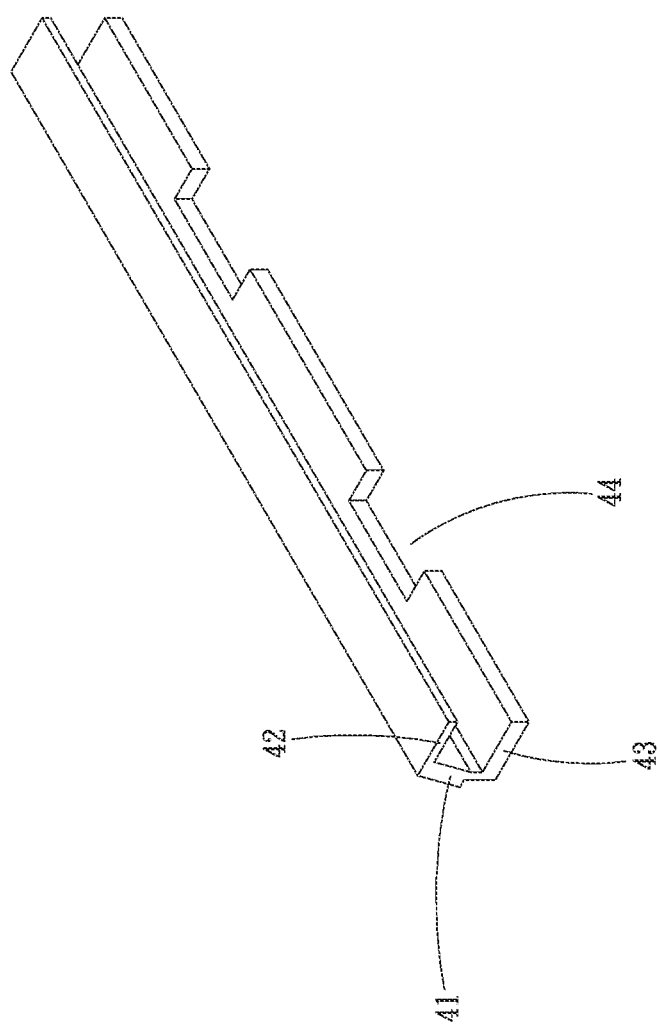
FIG. 6C is a perspective view of the filter member.

Please refer to FIGS. 6A, 6B and 6C. FIG. 6A is a sectional view of the optical touch component structure of the present invention, which has a filter member. FIG. 6B is a front view of the optical touch component structure of the present invention, which has a filter member. FIG. 6C is a perspective view of the filter member. The optical touch component structure of the present invention further includes a filter member 40 disposed in front of each optical touch module 20 to shield the LED components 213 from the interference of the environmental light. The filter member 40 such as an infrared filter member is made of a plastic material to which a dye is added. The infrared filters are generally classified into two types. The first type is high-pass filter, which is transparent to the light with a wavelength larger than 850 nm or 940 nm. The second type is low-pass filter, which is transparent to the light with a wavelength within a range from 925 nm to 955 nm. The above filter member is only an example and not intended to limit the material or form of the filter member of the present invention. Other suitable filter members are also applicable to the present invention.

The filter member 40 includes a main body 41, an upper protrusion section 42 extending from an upper end of the main body 41 to one side thereof and an extension section 43 extending from a lower end of the main body 41 to one side thereof. The upper protrusion section 42 extends to upper sides of the LED components 213. The main body 41 is positioned in front of the LED components 213 to shield the same. The extension section 43 extends into the space 23 between the first bottom face 212 of the LED circuit board 21 and the second top face 221 of the control circuit board 22 and between the first bottom face 212 of the LED circuit board 21 and the third top face 31 of the L-shaped connection board 30.

The extension section 43 is formed with recesses 44 in positions of the first and second connectors 214, 224 and the third and fourth connectors 225, 32 and the electronic components 261, 262 in the space 23. Therefore, the extension section 43 can extend into the space 23 without interfering with the first and second connectors 214, 224 and the third and fourth connectors 225, 32 or the electronic components 261, 262. An adhesive layer 45 is disposed between a lower surface of the extension section 43 and the control circuit board 22. The adhesive layer 45 has adhesion on both faces, whereby the extension section 43 is adhered to the control circuit board 22. The adhesive layer 45 is such as a double-faced adhesive tape or the like.

In conclusion, four optical touch modules 20 are connected with each other by means of four L-shaped connection boards 30 to form the optical touch component structure of the present invention in the form of a frame body. The first and second connectors 214, 224 are vertically connected with each other to connect the LED circuit boards 21 and the control circuit boards 22 of the optical touch modules 20 with each other. The third and fourth connectors 225, 32 are horizontally connected with each other to connect control circuit boards 22 and the L-shaped connection boards 30 with each other. Accordingly, not only the signals can be transmitted between the two circuit boards, but also the signals can be transmitted between the optical touch modules 20. The first and second connectors 214, 224 and the third and fourth connectors 225, 32 can be repeatedly plugged and unplugged. Therefore, it is convenient to locate and assemble the optical touch modules 20 without any soldering process. In this case, the malfunction due to improper soldering operation can be avoided. Moreover, the optical touch modules are easy to rework and service and reassemble into the original state. A height gap p exists between the opposite faces of the LED circuit board 21 and the control circuit board 22. This increases usable space so that electronic components with a height smaller than that of the first and second connectors 214, 224 can be arranged on the opposite faces of the LED circuit board 21 and the control circuit board 22. Also, the extension section 43 of the filter member 40 can be positioned in the space to increase the connection strength as a whole.

The present invention has been described with the above embodiments thereof and it is understood that many changes and modifications in the above embodiments can be carried out without departing from the scope and the spirit of the invention that is intended to be limited only by the appended claims.

What is claimed is:

1. An optical touch module comprising:
   an LED circuit board having a first top face and a first bottom face, multiple LED components being disposed on the first top face, the first bottom face having at least one first connector; and
   a control circuit board positioned under the LED circuit board, the control circuit board having a second top face and a second bottom face, the second top face facing the first bottom face of the LED circuit board and having at least one second connector corresponding to the first connector and two third connectors respectively positioned at two outermost ends of the second top face of the control circuit board and misaligned from the first connector, the first and second connectors being vertically mated with each other so as to connect the control circuit board under the LED circuit board, a height gap existing between the LED circuit board and the control circuit board, whereby a space is positioned between correspondingly overlapping sections of the first bottom face of the LED circuit board and the second top face of the control circuit board, the first and second connectors being positioned in the space.

2. The optical touch module as claimed in claim 1, wherein at least one electronic component is disposed under the first bottom face of the LED circuit board and positioned in the space.

3. The optical touch module as claimed in claim 1, wherein at least one electronic component is disposed on the second top face of the control circuit board and positioned in the space.

4. The optical touch module as claimed in claim 1, wherein at least one electronic component is disposed between correspondingly overlapping sections of the first bottom face of the LED circuit board and the second top face of the control circuit board.

5. The optical touch module as claimed in claim 1, wherein an extension section of a filter member is positioned in the space.

6. The optical touch module as claimed in claim 5, wherein the extension section of the filter member is formed with at least one recess in a position of the first and second connectors.

7. The optical touch module as claimed in claim 1, wherein the first connector is a male connector or a female connector, while the second connector is a female connector or a male connector.

8. The optical touch module as claimed in claim 1, wherein the second connector is vertically directed, while the third connector is horizontally directed.

9. An optical touch component structure comprising multiple optical touch modules and multiple L-shaped connection boards, which are assembled to form a frame body, each L-shaped connection board being connected between two optical touch modules of two sides of the frame body, each optical touch module including:
   an LED circuit board having a first top face and a first bottom face, multiple LED components being disposed on the first top face, the first bottom face having multiple first connectors; and
   a control circuit board positioned under the LED circuit board, the control circuit board having a second top face and a second bottom face, the second top face facing the first bottom face of the LED circuit board and having at least one second connector and two third connectors, the second connector corresponding to the first connector, the two third connectors being respectively positioned at two outermost ends of the control circuit board, the L-shaped connection boards being positioned under the LED circuit board and respectively connected to two ends of the control circuit boards, each L-shaped connection board having a third top face facing the first bottom face of the LED circuit board, the third top face of the L-shaped connection board having at least one fourth connector corresponding to the third connector, the first and second connectors being vertically mated with each other and the third and fourth connectors being horizontally mated with each other, a height gap existing between the LED circuit board and the control circuit board and between the LED circuit board and the L-shaped connection board, whereby a space is positioned between correspondingly overlapping sections of the first bottom face of the LED circuit board and the second top face of the control circuit board and between correspondingly overlapping sections of the first bottom face of the LED circuit board and the third top face of the L-shaped connection board, the first and second connectors and third and fourth connectors being positioned in the space.

10. The optical touch component structure as claimed in claim 9, wherein at least one electronic component is disposed under the first bottom face of the LED circuit board and positioned in the space.

11. The optical touch component structure as claimed in claim 9, wherein at least one electronic component is disposed on the second top face of the control circuit board and positioned in the space.

12. The optical touch component structure as claimed in claim 9, wherein at least one electronic component is disposed between correspondingly overlapping sections of the first bottom face of the LED circuit board and the second top face of the control circuit board.

13. The optical touch component structure as claimed in claim 9, wherein an extension section of a filter member is positioned in the space.

14. The optical touch component structure as claimed in claim 13, wherein the extension section of the filter member is formed with at least one recess in a position of the first, second and third connectors.

15. The optical touch component structure as claimed in claim 9, wherein the first connector is a male connector or a female connector, while the second connector is a female connector or a male connector.

16. The optical touch component structure as claimed in claim 9, wherein the third connector is a male connector or a female connector, while the fourth connector is a female connector or a male connector.

17. The optical touch component structure as claimed in claim 9, wherein at least one cushion pad is disposed between the LED circuit board and the control circuit board.

18. The optical touch component structure as claimed in claim 9, wherein at least one cushion pad is disposed between the LED circuit board and the L-shaped connection board.

19. An optical touch component structure comprising:
   multiple optical touch modules assembled into a frame body, each optical touch module including:
   an LED circuit board having a first top face and a first bottom face, multiple LED components being disposed on the first top face, the first bottom face having multiple first connectors; and
   a control circuit board positioned under the LED circuit board, the control circuit board having a second top face and a second bottom face, the second top face facing the first bottom face of the LED circuit board and having at least one second connector and two third connectors, the second connector being correspondingly in adaptation to the first connectors, the second bottom face having at least one third connector;
   multiple L-shaped connection boards positioned under the LED circuit boards, each L-shaped connection board having a third top face facing the first bottom face of the LED circuit board, the third top face of the L-shaped connection board having at least one fourth connector corresponding to the third connector, the first and second connectors being vertically mated with each other, two L-shaped connection boards being respectively connected to two ends of each control circuit board, the fourth connectors of the L-shaped connection board being horizontally connected with the third connectors, a height gap existing between the LED circuit board and the control circuit board and between the LED circuit board and the L-shaped connection board, whereby a space is positioned between correspondingly overlapping sections of the first bottom face of the LED circuit board and the second top face of the control circuit board and between the first bottom face of the LED circuit board and the third top face of the L-shaped connection board, the first and second connectors and the third and fourth connectors being positioned in the space; and multiple filter members respectively connected with the optical touch modules, each filter member including:

a main body;

an upper protrusion section extending from an upper end of the main body to one side thereof; and an extension section extending from a lower end of the main body to one side thereof, the upper protrusion section extending to upper sides of the LED components, the main body being positioned in front of the LED components to shield the LED components, the extension section extending into the space between the first bottom face of the LED circuit board and the second top face of the control circuit board and between the first bottom face of the LED circuit board and the third top face of the L-shaped connection board.

20. The optical touch component structure as claimed in claim 19, wherein the extension section of the filter member positioned in the space is formed with at least one recess in a position of the first, second and third connectors.

21. The optical touch component structure as claimed in claim 19, wherein an adhesive layer is disposed between a lower surface of the extension section and the control circuit board.

22. The optical touch component structure as claimed in claim 19, wherein at least one electronic component is disposed under the first bottom face of the LED circuit board and positioned in the space.

23. The optical touch component structure as claimed in claim 19, wherein at least one electronic component is disposed on the second top face of the control circuit board and positioned in the space.

24. The optical touch component structure as claimed in claim 19, wherein at least one electronic component is disposed between correspondingly overlapping sections of the first bottom face of the LED circuit board and the second top face of the control circuit board.

25. The optical touch component structure as claimed in claim 19, wherein the first connector is a male connector or a female connector, while the second connector is a female connector or a male connector.

26. The optical touch component structure as claimed in claim 19, wherein the third connector is a male connector or a female connector, while the fourth connector is a female connector or a male connector.

27. The optical touch component structure as claimed in claim 19, wherein at least one cushion pad is disposed between the LED circuit board and the control circuit board.

28. The optical touch component structure as claimed in claim 19, wherein at least one cushion pad is disposed between the LED circuit board and the L-shaped connection board.

* * * * *